United States Patent [19]  
Zugcic

[11] 3,828,668  
[45] Aug. 13, 1974

[54] IDENTIFICATION SYSTEM
[75] Inventor: Joseph Paul Zugcic, Morganville, N.J.
[73] Assignee: American Can Company, Greenwich, Conn.
[22] Filed: Oct. 6, 1972
[21] Appl. No.: 295,420

[52] U.S. Cl.................. 101/40, 116/124 R, 118/9, 198/40
[51] Int. Cl......................... B41f 17/22, B65g 43/00
[58] Field of Search........... 198/40; 101/40; 116/65, 116/124 R; 340/259, 213 Q; 118/10, 9

[56] References Cited
UNITED STATES PATENTS
2,629,486  2/1953  Eggleston et al................. 198/40 X
3,521,554  7/1970  Zurick ................................. 101/40

Primary Examiner—Robert E. Pulfrey
Assistant Examiner—Clifford D. Crowder
Attorney, Agent, or Firm—Robert P. Auber; Paul R. Audet; Harries A. Mumma, Jr.

[57] ABSTRACT

Identification system and method of correlating downstream work pieces with upstream working members for a work operation such as a can decorator line wherein a rotatable correlator disc having indicia radially thereon, located downstream adjacent a conveyor, correlates workpieces and/or their sites on an adjacently passing workpiece conveyor with upstream working members so that downstream identification can be made of working members that were in register or working relationship with the workpieces and/or their corresponding sites during operation of the working members. Direct relationship is established preferably by servo means between the rotation of the correlator disc and the working members.

27 Claims, 6 Drawing Figures

IDENTIFICATION SYSTEM

BACKGROUND OF THE INVENTION

This invention relates to identification systems. More particularly, it relates to work operations wherein work on a series of workpieces is effected by a plurality of working members and wherein there is a need such as during trouble-shooting, to identify downstream which of a plurality of upstream working members worked on one or more of the workpieces.

An example of such a work operation is a can decorator line wherein a series of one or two-piece can bodies, rapidly fed onto 24 mandrels of a rotating transfer turret, are decorated with ink applied by one of eight blankets of an abuttingly-adjacent also rotating decorator wheel. Upon being decorated the cans are removed from the mandrels and placed on pins of a pinchain conveyor which conveys the decorated cans to another workstation such as an oven for baking.

Heretofore, when can decorator lines were not operating properly, such as when cans were defectively decorated, dented or sporadically not transferred onto pins of the conveyor, there was no effective way to determine and identify downstream which of the respective upstream blankets, mandrels or 24 corresponding transfer mechanisms was causing the problem. When a downstream monitor found a defective can, he had several inefficient and ineffective methods of identifying the cause of the problem.

One was to stop the line and go upstream to inspect each or all 24 transfer mechanisms and/or mandrels, and/or each or all eight blankets.

Another was to start with the pin on which sat the defective can and jog the pinchain conveyor or go back on it and inspect each can until another defective can was found. If the defect appeared every 24 cans, it was a mandrel or transfer problem and the monitor either had to inspect each mandrel and corresponding transfer mechanism or had to count back in sets of 24 to find the particular defectively-operating mandrel or mechanism.

Still another method was to jog the machine while visually inspecting the operation of the mechanisms.

All of these methods of identifying the cause of the problem are very time consuming. Additional disadvantages of, for example, jogging are that some problems such as those relating to transfers or to proper blanket pressure cannot be identified during jogging since they only manifest at high or full speeds such as 400 to 600 cans/per minute. At such speeds, such problems usually cannot be observed. Further, jogging is often wasteful. Cans are lost for example due to extra heavy ink deposits thereon. Also, some decorator line machines automatically reject cans during jogging.

Now, according to this invention, the aforementioned and other disadvantages are overcome. This invention allows a monitor to quickly and easily identify downstream which of a plurality of upstream transfer, mandrel, or blanket working or operating members is or are causing defects and problems.

SUMMARY OF THE INVENTION

This invention is an identification system. The identification system can be used in or as an improvement in a can decorating line or system, or to improve a correlating method or a method of operating a can decorator line.

The identification system comprises: working members such as those mounted on and including a turret in turn mounted on a shaft, for doing work in relation to a series of workpieces such as can bodies; conveying means having or not having workpiece sites for conveying the worked workpieces from a work area adjacent the working members to another location; and correlating means for correlating downstream from the work areas, the workpiece sites and/or the worked workpieces with the working members to identify which working members were associated with the respective upstream workpieces, which correspond with the respective workpiece sites, if there are some. The correlating means can include a disc which can be rotatable, having indicia thereon, the indicia being correlated to the workpieces, the workpiece sites and the working members. The correlating means can also include means for driving the disc in a manner that obtains the correlation, as by effecting a direct relationship between rotation of the disc, movement of the workpieces and/or sites past the indicia, and the rotation and/or working action of the working members. The correlation or direct relationship can be effected by mechanical or electrical connection such as by a pair of suitably connected transmitting and receiving servo motors. When the workpieces are can bodies, the working members can include printing blankets mounted on a decorator wheel, mandrels mounted on a mandrel turret and preferably, transfer means including a transfer turret tied to the mandrel turret for transferring the can bodies from the mandrels to the conveying means. When the workpieces are can bodies, the direct relationship preferably is effected in part by a transmitting servo motor connected to and driven in a 1:1 ratio by the turret shaft and electrically connected to a receiving servo motor shaft which has the disc fixedly mounted thereon.

The improved can decorating system of this invention is of the type including the structures mentioned in relation to working can bodies, the improvement which comprises, the employment of a correlator, adjacent the conveyor downstream from the transfer turret and having indicia thereon, for correlating in the previously mentioned manner, and, the employment of driving means for driving the correlator in a manner that obtains the correlation. The correlator preferably is the aforementioned rotatable disc having indicia preferably radially thereon and correlated to the can sites, mandrels, blankets and/or transfer means for effecting the correlating in the aforementioned manner. When the improvement comprises the employment of the transfer means for transferring decorated cans from the mandrels to the conveyor can sites, the improvement further comprises the correlator also correlating the can sites with the transferring means. The improvement can further comprise the employment of a servo motor transmitter and servo motor receiver as preferred in the identification system of this invention, and it can further comprise including a fixed alignor means adjacent the disc for aligning its indicia with conveyor can sites.

In the improved method of this invention, for correlating, downstream, worked workpieces and/or their sites on a conveyor, with upstream working members which have effected work on the workpieces, the improvement comprises providing the rotatable correlator disc having radial indicia thereon for correlating the indicia with the worked workpieces and/or their sites and the working members. The improvement can also include obtaining the aforementioned direct relationship by effecting a mechanical connection or by an electrical connection as by the aforementioned use of transmitting and receiving servo motors.

In the improved method of this invention for operating a can decorator line of the type previously mentioned, the improvement can be as above-stated in relation to the improved method of correlating.

DETAILED DESCRIPTION OF THE INVENTION

Figure 1:
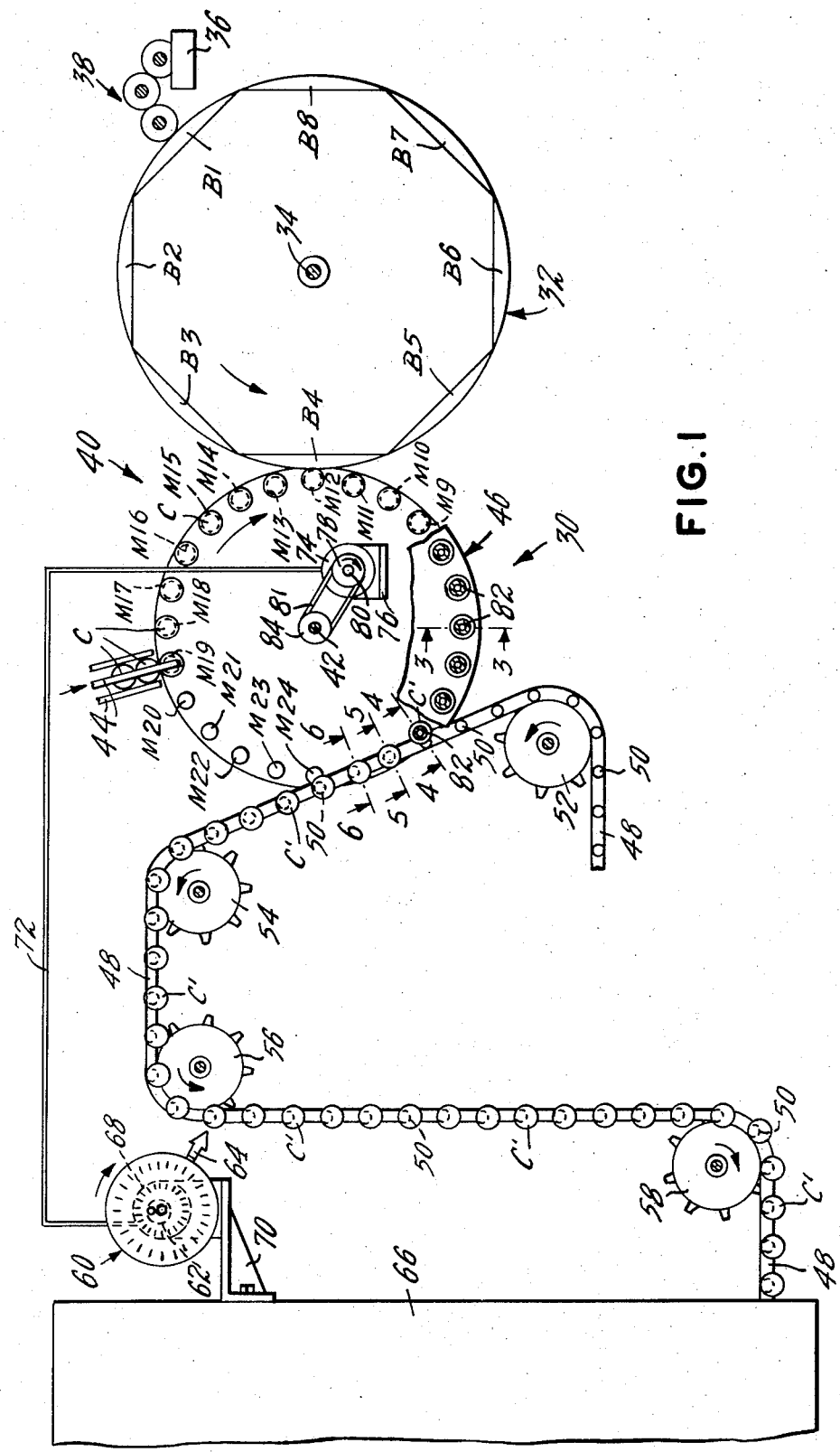
FIG. 1 is a schematic view of a can decorator line or system employing the identification system of this invention.

Referring to the drawings in detail, FIG. 1 shows an embodiment of the identification system of this invention as it can be employed with and as an improvement in a can decorator line or system and/or in its method of operation. The line or system is exemplary of the type of machinery with which the identification system of this invention can be employed.

More particularly, FIG. 1 shows a can decorator line generally designated 30 comprising a decorator wheel generally designated 32 mounted on a shaft 34 and having mounted around its periphery a series of eight blankets respectively designated B1 through B8 which receive decorator material such as ink (not shown) in a container 36 by means of a series of shaft-mounted, abuttingly-rotating rollers generally designated 38, the roller must adjacent to decorator wheel 32 here shown applying ink to blanket B1 as decorator wheel 32 rotates in a counterclockwise direction.

Abuttingly-adjacent decorator wheel 32 at about the 9 o'clock position is a mandrel turret generally designated 40, rotatingly-driven on shaft 42 by means such as a main drive motor (not shown) and having a series of mandrels designated M1 through M24 mounted substantially parallel to shaft 42 and protruding towards the reader from adajcent the periphery of mandrel turret 40. Both decorator wheel 32 and mandrel turret 40 are gear driven by the main drive motor.

Shown near the top of mandrel turret 40 are workpieces, here undecorated can bodies C, being fed through guide rails 44 to suitable feeding means (not shown) which feed cans C onto the mandrels in a suitable manner. Shown broken away near the bottom of and overlying mandrel turret 40, between the mandrels M4 through M8 and the reader, is transfer means including a transfer turret generally designated 46, which, in a manner shown in FIGS. 3–6 and described later, removes decorated can bodies C' from the mandrels and places them on a conveying means such as a conveyor, here on workpiece sites such as pins 50 of an endless pinchain conveyor generally designated 48. Pinchain conveyor 48 is passed upwardly adjacent mandrel turret 40, between its mandrels and transfer turret 46, by counterclockwisely-rotating shaft-mounted sprockets 52, 54 and 56 respectively having a plurality of teeth and driven by the main drive means but also capable by clutch means (not shown), of being driven by suitable independent driving means (not shown). Pinchain conveyor 48 passes decorated cans C' past correlator means including a correlator such as rotatable correlator disc 60 mounted on shaft 62 and having one or more sets of indicia, here two circular sets of different circumference (schematically shown), each unit of which can be aligned by suitable alignor means such as pointer 64, with respective, correlated, decorated can bodies C' passing adjacently thereby on pinchain conveyor 48. Pinchain 48 takes can bodies C' around sprocket 58 to another location or work station such as oven 66 where they are for example baked to cure the ink coating just applied thereon.

As shown in FIG. 1 and as will be explained in detail later, servo motor receiver shaft 62, on which is mounted correlator disc 60, is clockwisely rotatingly-driven by its servo motor receiver 68 bolt-mounted through bracket 70 to oven 66 and electrically connected by wires (not shown) within a suitable cable 72, to servo motor transmitter 74 in turn mounted on a frame 76. Pulley 78 of servo motor transmitter 74 is connected to transmitter shaft 80 and driven to rotate clockwisely by timing belt 81 connected to and driven by mandrel turret pulley 84 connected to and driven clockwisely by mandrel turret shaft 42.

Figure 2:
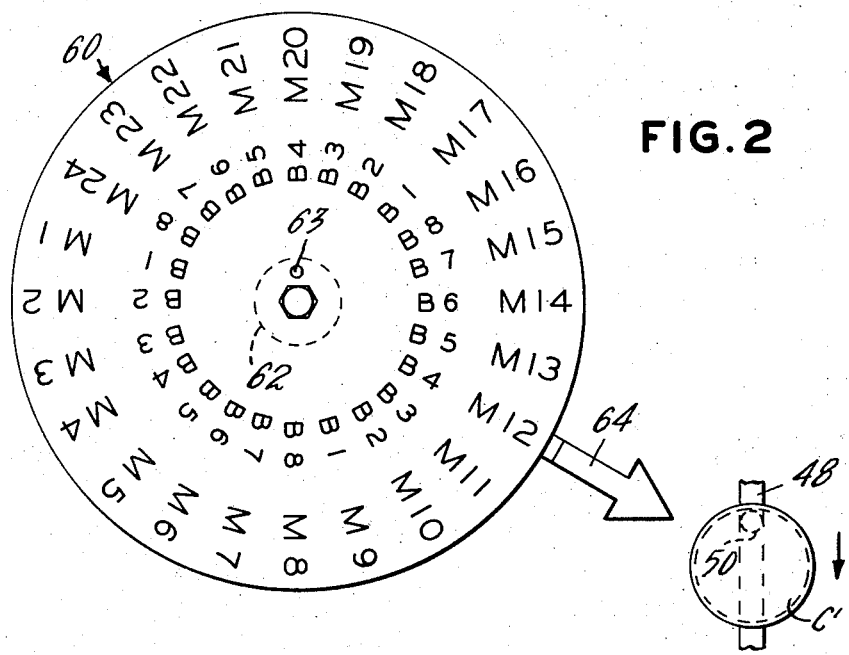
FIG. 2 is an enlarged detailed view of the correlator disc shown at the upper left of the can decorator line shown in FIG. 1.

FIG. 2 shows a portion of the correlator means of this invention, and more particularly shows correlator disc 60 threadedly-mounted by a bolt to servo motor receiver shaft 62 and affixed thereto by pin 63. FIG. 2 shows in detail, the indicia which can be placed on the correlator disc for correlating the can sites, i.e. pins 50 and the decorated can bodies C' thereon, so that by looking at the correlated indicia aligned by suitable alignor means such as pointer 64 with a particular pin 50 or can body C', a determination can be made downstream at the location of the correlator disc, which particular blanket and which particular mandrel was associated with the aligned pin 50 and/or can body C'. FIG. 2 shows two circular groups of indicia each of whose units are radially located on the disc, the circular group interiormost in relation to shaft 62 being a series of three sets of B numbers, each set running consecutively from B1 to B8. Each B number corresponds to a particular blanket of the same number on decorator wheel 32. The outermost circular group of indicia, adjacent the periphery of correlated disc 60, is a series of M numbers running consecutively from M1 through M24, each M number corresponding to a particular mandrel and to a particular corresponding transfer means having the same number on respective mandrel turret 40 and transfer turret 46.

The reason the interiormost group of indicia has three sets of B numbers is explained below. Decorator wheel 32 having eight blankets thereon rotates about three times as fast as turret 40, having 24 mandrels thereon. During one revolution of wheel 32, one blanket, say B1, applies ink to three cans on three mandrels, say, first to a can on mandrel M1, then to one on mandrel M9, and then to one on mandrel M17. As shown in FIG. 2, each blanket B number that applies ink to a can on a mandrel is radially aligned with the corresponding M number of the mandrel. Thus, in the example previously mentioned, between the 9 and 10, 4 and 5, and 1 and 2 o'clock positions on correlator disc 60, the blanket number B1 is radially aligned with mandrel numbers M1, M9 and M17. A downstream monitor observing a defect in decorated can bodies C' shown in FIG. 2 or observing a bare pin 50, i.e. one not having a can thereon, can immediately read the aligned M number and B number on disc 60 and then go directly to the identified upstream responsible, defective transfer means, and/or mandrel and/or blanket here B4 and M12 for corrective action, rather than having to, for example, examine all 24 mandrels and/or eight blankets to determine which is causing or caused the defect.

FIGS. 3–6 are enlarged views partly in cross-section taken substantially along lines 3—3 through 6—6 of FIG. 1 and showing in sequence the operation of the transfer means of this invention in transferring decorated can bodies C' from mandrels M to pinchain conveyor pins 50.

Figure 3:
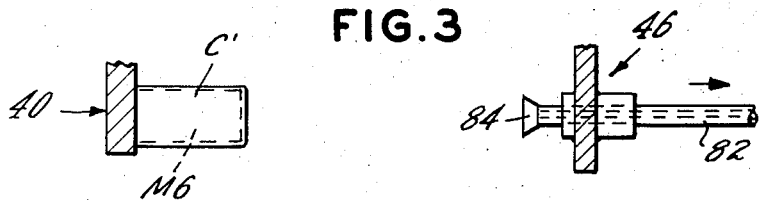
FIGS. 3–6 are enlarged, views partly in cross section taken substantially along respective lines 3—3 through 6—6 of FIG. 1.
Figure 3:
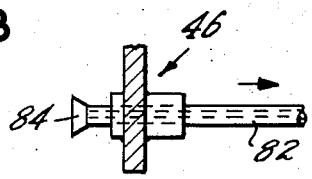

The right hand portion of FIG. 3 shows a broken away portion of a transfer means, here including a transfer turret generally designated 46 having bearing supports for supporting a series of 24 extendable hollow rods, each generally designated 82. Transfer turret 46 is about the same size as mandrel turret 40 and each rod 82 is aligned with its respective corresponding mandrel here M6 and maintains that alignment as both turrets are driven in continuous rotation on their common shaft 42 (here, not shown).

FIG. 3 shows rod 82 withdrawn and in its retracted position before a cam or other suitable means extends the rod out towards can body C'.

Figure 4:
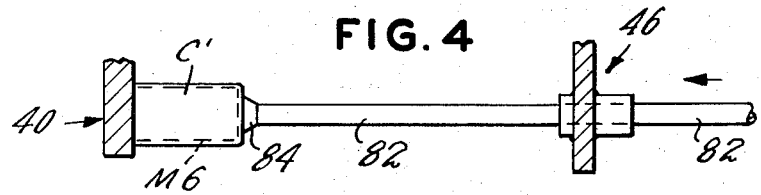
Figure 5:
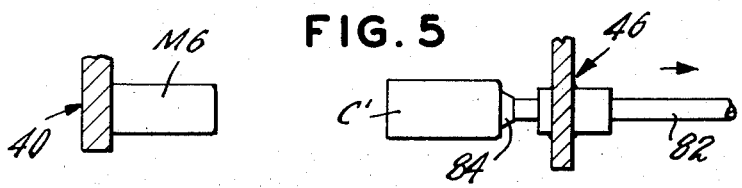

FIG. 4 shows rod 82 fully extended so that its suction cup 84 contacts the bottom of decorated can body C' and holds the can body against vacuum cup 84 by a vacuum applied through the bore of hollow rod 82.

FIG. 5 shows rod 82 again in its withdrawn, retracted position vacuum holding decorated can body C' against its cup 84 after having stripped the can from its corresponding now exposed mandrel M6.

Figure 6:
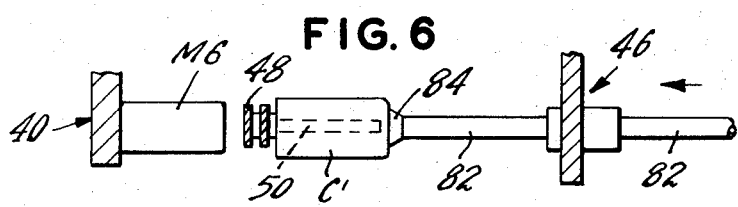

FIG. 6 shows a portion of pinchain conveyor 48 passing between mandrel M6 of mandrel turret 40, and transfer turret 46. Pinchain conveyor 48 passes between the respective turrets in a manner such that the axis of its pin 50 is substantially horizontally aligned with that of mandrel M6 and corresponding rod 82. This renders rod 82 in a position to place a decorated can body C' on pin 50 when the rod 82 is extended sufficiently outwardly from transfer turret 46. Can body C' is deposited on pin 50 by suitable means, here, when the vacuum exerted through rod 82 is terminated and an outflow of air is exerted to assist deposition of the can body on pin 50 as pinchain conveyor 48 continues in its travel to carry the can ultimately to oven 66. As soon as can C' is deposited on pin 50, rod 82 again retracts into its support bearing in transfer turret 46 where it remains throughout the rotation of mandrel turret 40 until mandrel M6 having another decorated can body thereon and rod 82 reach approximately the position of lines 3—3 of FIG. 1.

Briefly, when the improved can decorating line or system shown in FIGS. 1–6 employing the identification system of this invention is placed in operation, a blanket such as B4 on decorator wheel 32 having received ink from one of the applicator rolls, 38, applies ink to an undecorated can body C on mandrel M12 of clockwisely rotating mandrel wheel 40. The can body is thereafter transferred from mandrel M12 to a pin 50 on pinchain conveyor 48 by rod 82 and is passed adjacently by correlator disc 60 as the can is taken to oven 66.

The principle of the invention involves establishing and maintaining during the working operation, a direct relationship between the rotation of decorator wheel 32, mandrel wheel 40, transfer turret 46, and correlator disc 60. In the can decorator line or system shown in the drawings, the direct relationship between decorator wheel 32 and mandrel turret 40 is obtained by their being permanently gear-connected to and driven by the same main driving means (not shown) and the direct relationship between mandrel turret 42 and transfer turret 46 is obtained by their being fixed to and driven by the same shaft 42.

The direct relationship between correlator disc shaft 62 and mandrel shaft 42 can be effected in any suitable manner. In can decorator lines such as shown in FIG. 1 wherein clutch mechanisms can be employed to remove pin-chain 48 from the main drive and to connect it to an independent auxiliary drive, a direct relationship during the working operation can be obtained by use of a servo motor transmitter such as 74 driven by mandrel wheel shaft 42 and electrically connected through cable 72 to a servo motor receiver shaft 62 whose rotation drives correlator disc 60 in a 1:1 ratio with the rotation of shaft 42.

When the can decorator line or other working machine is of the type wherein a permanent direct relationship is maintained throughout operation of the line, e.g. the pinchain is permanently connected to and driven by the main drive means, a direct relationship between for example mandrel wheel shaft 42 and correlator disc shaft 62 can be established and maintained by direct mechanical connection such as by a chain, timing belt or gears.

In the can decorator line shown, a direct relationship is obtained between indicia on correlator disc 60 and the can sites or pins 50 since the pins are fixedly spaced one from another, and since, when the decorator line is not operating, cans are not being deposited on pins. When the line is started, cans are again deposited upon the pins. A monitor can therefore correlate the first can on a pin after a gap between cans left during non-operation, with corresponding aligned indicia on correlator disc 60 as the first can on the pin passes pointer 64.

When during operation of the line, there is a malfunction with the transfer mechanism and a can is not deposited upon a workpiece site such as pin 50, a downstream monitor reading the indicia as the pin passes pointer 64 can identify the faulty transfer vacuum rod 82 by reading the aligned M number, since each mandrel number corresponds with a similarly numbered vacuum rod 82.

The identification system of this invention is not to be considered employable only with a can decorator line. Rather, it is employable with any machinery, line or system wherein upstream working members do work in relation to a series of workpieces and wherein there is employed conveying means for conveying the worked workpieces from the work area adjacent the working members to a downstream location. The correlator means of this invention, here embodied in correlator disc 60, correlates downstream of the work areas, the worked workpieces or their sites with the working members to identify which working members were associated with the workpieces or sites during operation of the machine, line or system. As mentioned, the correlator means or disc 60 must be driven in a manner that obtains a correlation between its indicia, the workpieces or sites and the working members during their operation. It is to be noted that by "working members" herein is meant inter alia turrets 40 and 46, decorator wheel 32, their respective mandrels and blankets, and vacuum rods 82. The identification system of this invention is especially suitable for machines, lines and systems such as can decorator lines wherein similar work is effected upon or in relation to a series of similar workpieces, there being a time and/or space relationship present during the operation of working members and wherein transfer and/or conveying means are employed which maintain this time or spaced relationship between the respective workpieces, so that indicia of a downstream correlator means such as correlator disc 60 having such time and/or space relationship embodied therein can be registered, correlated coincided and corresponded with the respective workpiece sites on the conveyor, the workpieces and the working members. In other words, the identification system in essence requires registration between the various factors, aspects and structures which are to be correlated.

Examples of the above systems wherein workpieces are conveyed from a working member or machine to a downstream located without losing the direct relationship, registration, order, or time and/or space relationship, or without losing the index position on the conveyor, are all can decorating, printing, coating, or spraying, continuous motion or indexing machines. Other examples of machines are various punch presses or like machines wherein transfer mechanisms pass a product in registered sequence past a work station in a machine and then without losing the registered sequence, pass the workpiece or product past another point where the correlator means is located, the correlator being connected for direct relationship to the machine.

The correlator means of this invention need not be a correlator in the form of a disc as shown, but can be any suitable means having indicia which would operate in harmony with the aforementioned principles of this invention. The correlator means can be located at any suitable point downstream from the work area and the indicia can be read visually or by any other suitable means such as an electric eye, a timed strobe light, or means employed with a solid state network.

Correlator means or correlator disc 60 should be tailored to the individual piece of equipment so that there might be one division or unit of indicia for each work station or working member of the machine or machines. Thus, if a decorator were employed with 12 mandrels, a series of indicia would run from M1 through M12.

The location and manner in which the indicia and alignor means such as pointer 64 are employed in relation to the correlator means can be any suitable means consonant with the particular operation of the working members and conveying means.

When the identification system of this invention employing the correlator means or correlator disc 60 of this invention, is employed in the correlated, direct relationship previously described, for can decorating systems such as the type shown in the drawings, and when it is employed as part of the method of operating such can decorator line, or as part of a method of correlating as described, there is obtained an improvement in the system, line or in its method of operation. The identification system of this invention can therefore be employed to improve any method of correlating downstream the sites of a workpiece conveyor with upstream working members which have effected work on the workpieces.

It is thought that the invention and many of its attendant advantages will be understood from the foregoing description and it will be apparent that various changes may be made in the form, construction and arrangement of parts of the systems, lines and working members mentioned herein and in the accomplishment of the methods described herein, without departing from the spirit and scope of the invention or sacrificing all of its material advantages, that which is hereinbefore described being merely preferred embodiments thereof.

I claim:

1. An identification system comprising:
working members for doing work in relation to a series of workpieces,
conveying means for conveying the worked workpieces from the working members past a downstream location, and
correlating means at the downstream location and including indicia indicative of the respective working members, the indicia being alignable with the worked workpieces as they are conveyed past the location, for correlating the worked workpieces with the working members to identify which working members were in working relationship with the respective worked workpieces.

2. An identification system for downstream correlation of sites of a workpiece conveyor with upstream working members, comprising:
working members for doing work on workpieces,
conveying means having workpiece sites, for conveying the worked workpieces from the working members to a downstream location,
correlating means at the downstream location, including indicia indicative of the working members, the indicia being alignable with the workpiece sites as they are conveyed past the indicia for correlating the workpiece sites with the working members to identify which working members were in register with the respective workpiece sites.

3. The identification system of claim 2 wherein the correlating means includes fixed alignor means, and a rotatable disc located adjacent the conveyor at the downstream location and having indicia radially dispersed thereon indicative of the working members and alignable by the alignor means with and correlated to the workpiece sites as they are conveyed past the indicia, and means for driving the disc in a manner that obtains the correlation between the indicia, the workpiece sites and the working members during operation of the working members.

4. The identification system of claim 3 wherein the working members are turret-mounted, and the driving means includes a transmitting servo motor connected to and driven in a 1:1 ratio by the turret shaft, and electrically connected to a receiving servo motor whose shaft has the disc mounted thereon.

5. The identification system of claim 4 wherein the workpieces are can bodies, the working members include printing blankets mounted on a decorator wheel, mandrels mounted on the turret and transfer means directly tied to the turret for transferring decorated can bodies from the mandrels to the workpiece sites.

6. The identification system of claim 4 wherein the direct relationship is effected by a mechanical connection.

7. An improved can decorating system of the type including decorator wheel having printing blankets thereon, a mandrel turret having mandrels thereon for mounting the cans while they are being decorated by the blankets, and conveying means including a conveyor having can sites for conveying the decorated cans to a downstream location, the improvement which comprises:

a correlator, adjacent the conveyor downstream from the mandrel turret, the correlator having indicia thereon indicative of the blankets and mandrels for correlating the decorated cans with the mandrels and blankets as the decorated cans are conveyed past the indicia to permit a downstream identification to be made of the particular blankets and mandrels that were in working relationship with the respective cans during their decoration and passage through the system, and means for operating the correlator in a manner that obtains the correlation.

8. The improved can decorating system of claim 7 wherein the system is of the type also including means for transferring the decorated cans from the mandrels to the conveyor can sites, the improvement which further comprises the correlator also correlating the decorated cans with the transferring means to permit a downstream identification to also be made of the particular transferring means that was in working relationship and, with the respective cans.

9. The improved can decorating system of claim 8 wherein the correlator is a rotatable disc having its indicia radially disposed thereon.

10. The improved can decorating system of claim 9 wherein the improvement further comprises the means for operating the correlator including a servo motor transmitter connected to and driven in a 1:1 ratio by the mandrel turret shaft and being electrically connected to a servo motor receiver whose shaft is fixedly connected to and drivingly rotates the disc.

11. The improved can decorating system of claim 10 wherein the improvement further comprises fixed alignor means adjacent the disc for aligning its indicia with the conveyor can sites.

12. The improved can decorating system of claim 8 wherein the improvement further comprises the means for operating the correlator including a servo motor transmitter connected to and driven in a 1:1 ratio by the mandrel turret shaft and being electrically connected to a servo motor receiver whose shaft is fixedly connected to and drivingly rotates the correlator.

13. The improved can decorating system of claim 7 wherein the correlator is a rotatable disc having indicia radially dispose thereon.

14. The improved can decorating system of claim 13 wherein the improvement further comprises the means for operating the correlator including a servo motor transmitter connected to and driven in a 1:1 ratio by the mandrel turret shaft and being electrically connected to a servo motor receiver whose shaft is fixedly connected to and drivingly rotates the disc.

15. The improved can decorating system of claim 7 wherein the improvement further comprises the means for operating the correlator including a servo motor transmitter connected to and driven in a 1:1 ratio by the mandrel turret shaft and being electrically connected to a servo motor receiver whose shaft is fixedly connected to and drivingly rotates the correlator.

16. An improved method of correlating, downstream, worked workpieces of a conveyor for conveying the worked workpieces from work areas adjacent working members to a downstream location, with upstream working members which have effected work on the workpieces, the improvement which comprises:

providing, adjacent the conveying means at the downstream location, a rotatable correlator disc having radial indicia thereon indicative of the working members, providing a fixed pointer adjacent the disc, aligning by means of the pointer the respective indicia with the worked workpieces as they are conveyed past the indicia and correlating the worked workpieces with the working members to identify at the downstream location which working members were in working relationship with the respective worked workpieces.

17. The improved method of correlating of claim 16 wherein the working members are connected to driving shafts, the improvement which further comprises obtaining the correlation by mechanically connecting and establishing a direct relationship between the driving shafts of the working members and the shaft which drivingly rotates the correlator disc.

18. The improved method of correlating of claim 16 wherein the working members are connected to driving shafts, the improvement which further comprises obtaining the correlation by connecting a transmitting servo motor to and driving it driven in a 1:1 ratio by the driving shafts of the working members and electrically connecting the transmitter to a receiving servo motor whose shaft drivingly rotates the correlator disc.

19. The improved method of correlating of claim 18 wherein the worked workpieces are transferred from the work areas to the conveyor by transfer means, the improvement which further comprises the disc indicia also indicative of and correlating the respective transfer means which operated on the respective workpieces.

20. An improved method of correlating, downstream, the sites of worked workpieces of a conveyor for conveying worked workpieces from work areas adjacent working members to a downstream location, with upstream working members which have effected work on the workpieces, the improvement which comprises:

providing, adjacent the conveying means at the donwstream location, a rotatable correlator disc having radial indicia thereon indicative of the working members, providing a fixed pointer adjacent the disc, aligning by means of the pointer the respective indicia with the sites as they are conveyed past the indicia and correlating the workpiece sites with the working members to identify at the downstream location which working members were in registration with the respective workpiece sites.

21. The improved method of correlating of claim 20 wherein the working members are connected to driving shafts, the improvement which further comprises obtaining the correlation by mechanically connecting and establishing a direct relationship between the driving shafts of the working members and the shaft which drivingly rotates the correlator disc.

22. The improved method of correlating of claim 20 wherein the working members are connected to driving shafts, the improvement which further comprises obtaining the correlation by connecting a transmitting servo motor to and driving it in a 1:1 ratio by the driving shafts of the working members and electrically connecting the transmitter to a receiving servo motor whose shaft drivingly rotates the correlator disc.

23. The improved method of correlating of claim 22 wherein the worked workpieces are transferred from the work areas to the conveyor by transfer means, the improvement which further comprises the disc indicia also indicative of and correlating the respective transfer means which operated on the respective workpieces.

24. An improved method of operating a can decorator line of the type wherein can bodies on mandrels of a mandrel turret are decorated by printing blankets on an adjacent decorator wheel and transferred by transfer means from the mandrels to a conveyor and conveyed to a downstream location, the improvement which comprises:

providing, adjacent the conveyor at the downstream location, a rotatable correlator disc having radial indicia thereon indicative of the mandrels, blankets and transfer means, and a fixed pointer adjacent the disc aligning by means of the pointer the respective indicia with the can bodies as they are conveyed past the indicia and correlating the can bodies with the mandrels, blankets and transfer means to identify at the downstream location which of the particular transfer means, blankets and mandrels were in upsteam direct working relationship with the respective decorated can bodies during operation of the decorator line.

25. The improved method of operating a can decorator line of claim 24, the improvement which further comprises obtaining the correlation by connecting a servo motor transmitter to and driving it in a 1:1 ratio by the shaft which drives the turret and electrically connecting the transmitter to a servo motor receiver whose shaft drivingly rotates the correlator disc.

26. An improved method of operating a can decorator line of the type wherein can bodies on mandrels of a mandrel turret are decorated by printing blankets on an adjacent decorator wheel and transferred by transfer means from the mandrels to can sites on a conveyor and conveyed to a downstream location, the improvement which comprises:

providing, adjacent the conveyor and downstream from the mandrels, a rotatable correlator disc having radial indicia thereon indicative of the mandrels, blankets and transfer means, and a fixed pointer adjacent the disc, aligning by means of the pointer, the indicia with the mandrels, blankets and transfer means, and correlating them with the workpiece sites as they are conveyed past the downstream location, to identify, at the downstream location, which of the particular transfer means, blankets and mandrels were in register with the respective sites during operation of the decorator line.

27. The improved method of operating a can decorator line of claim 26, the improvement which further comprises obtaining the correlation by connecting a servo motor transmitter to and driving it in a 1:1 ratio by the shaft which drives the turret and electrically connecting the transmitter to a servo motor receiver whose shaft drivingly rotates the correlator disc.

* * * * *